June 2, 1953  G. H. MOREY  2,640,907
WARMING DEVICE
Filed Dec. 1, 1950  3 Sheets-Sheet 1
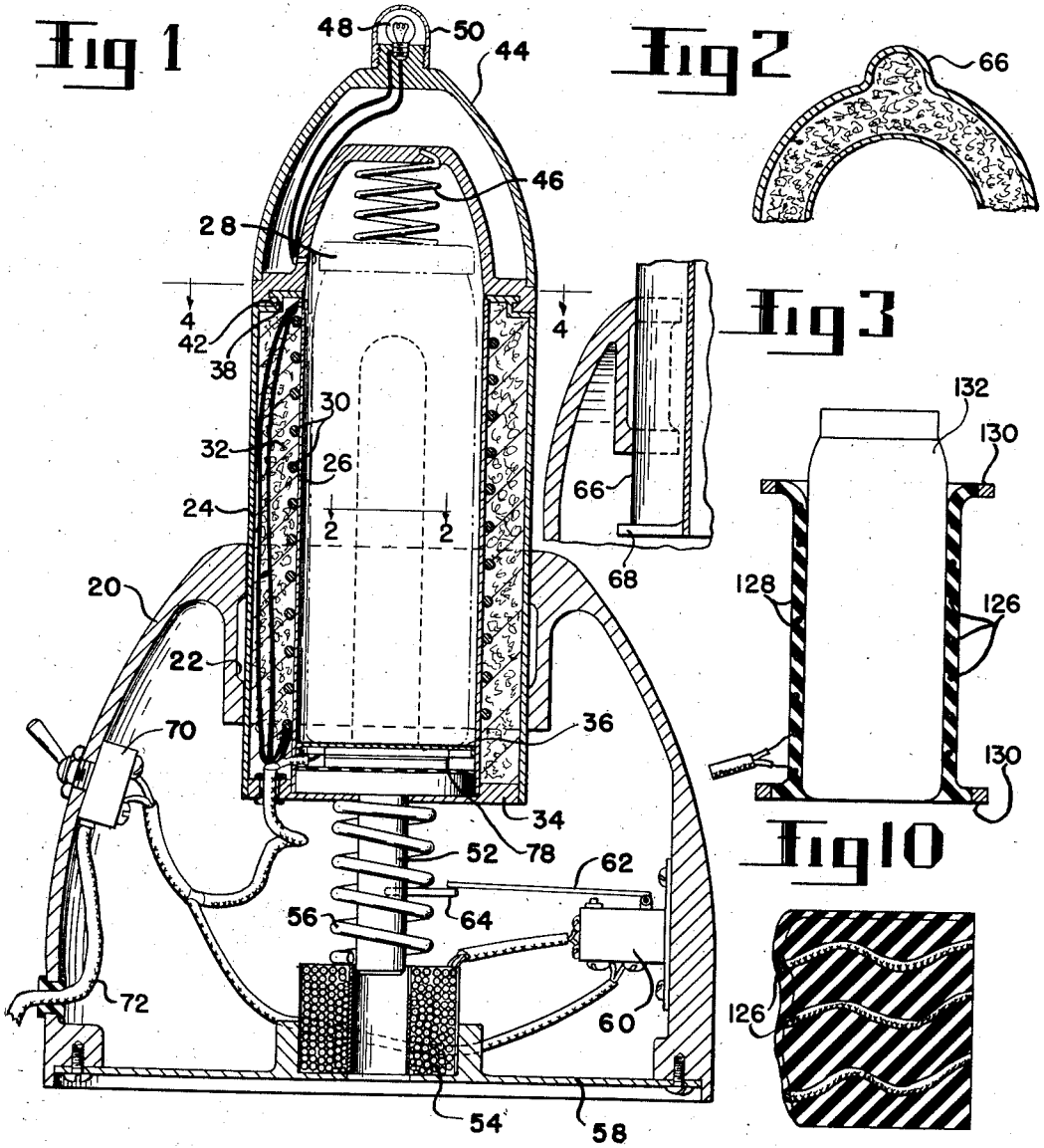
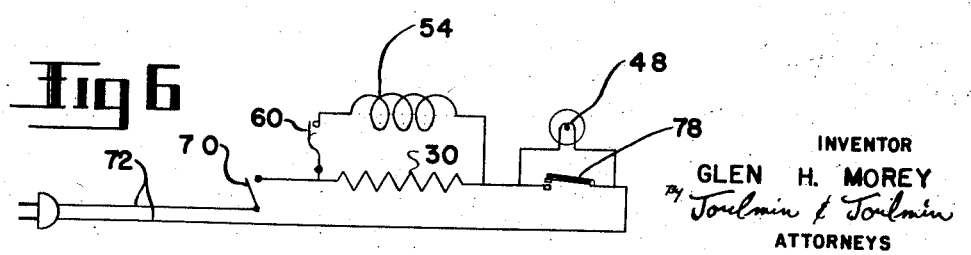
INVENTOR
GLEN H. MOREY
Toulmin & Toulmin
ATTORNEYS June 2, 1953
G. H. MOREY
2,640,907
WARMING DEVICE
Filed Dec. 1, 1950
3 Sheets-Sheet 2
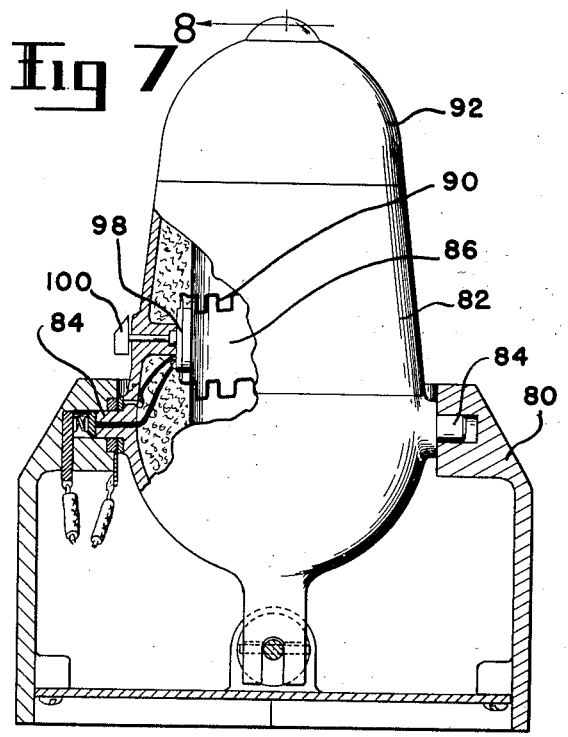
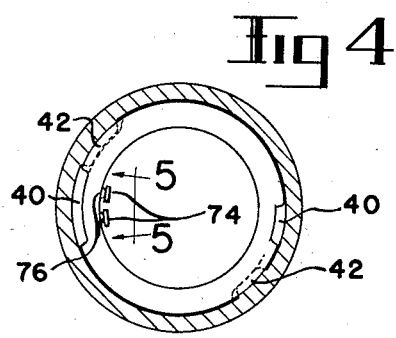
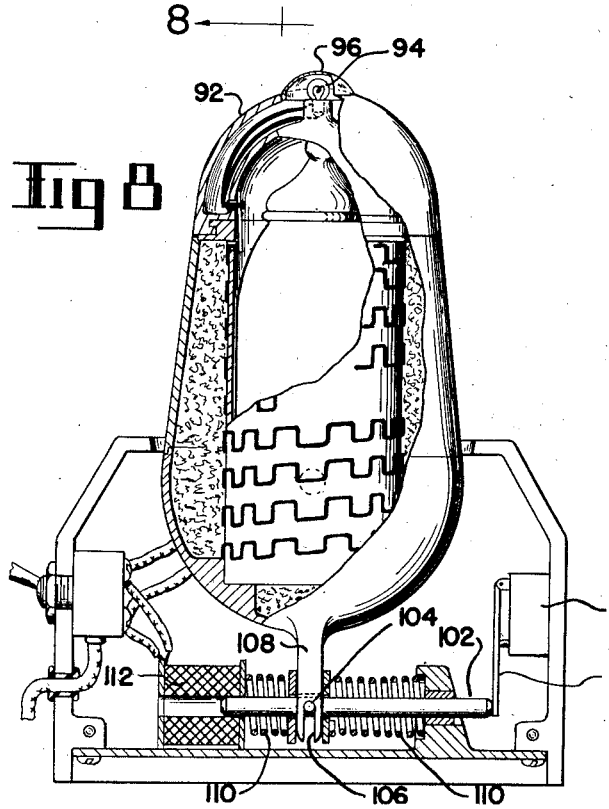
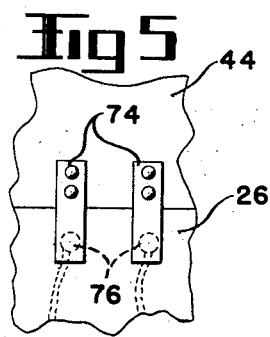
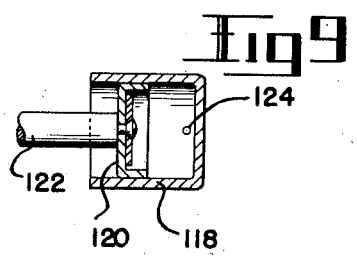
INVENTOR
GLEN H. MOREY
Toulmin & Toulmin
ATTORNEY June 2, 1953
G. H. MOREY
2,640,907
WARMING DEVICE
Filed Dec. 1, 1950
3 Sheets-Sheet 3
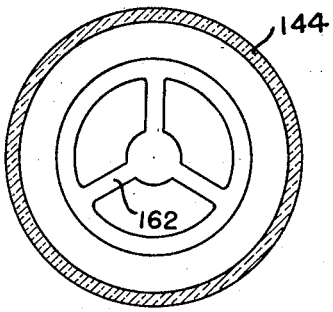
FIG. 12
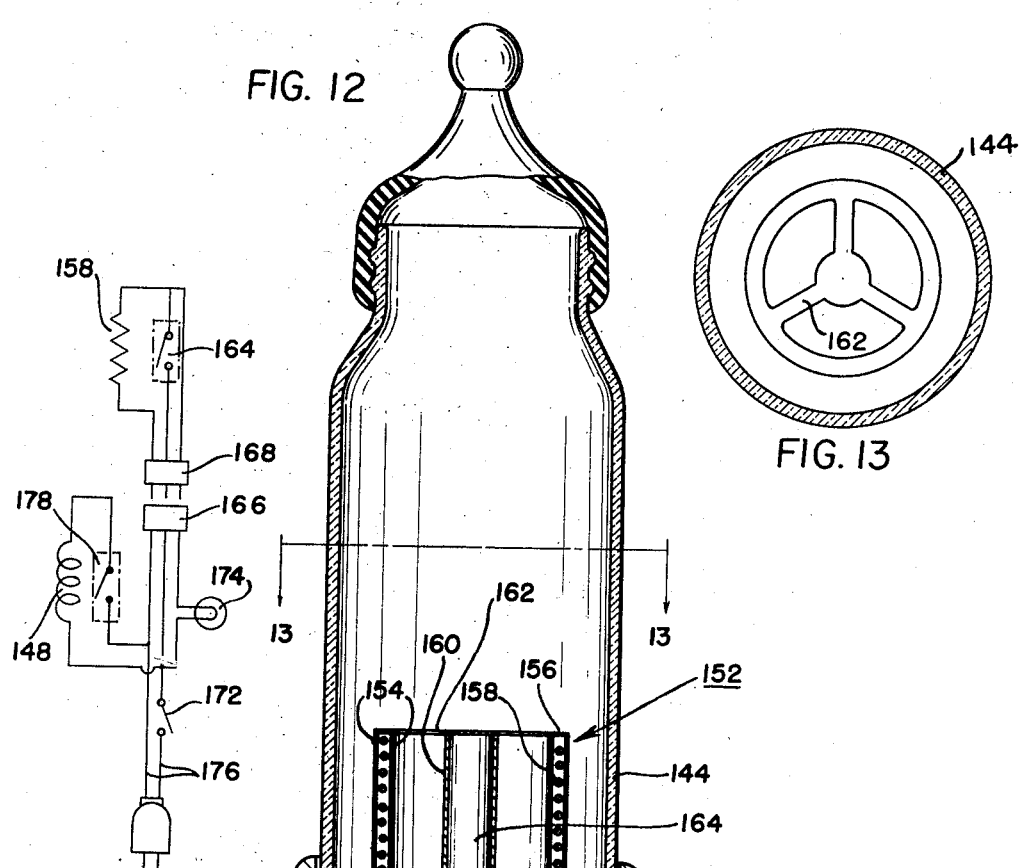
FIG. 13
FIG. 14
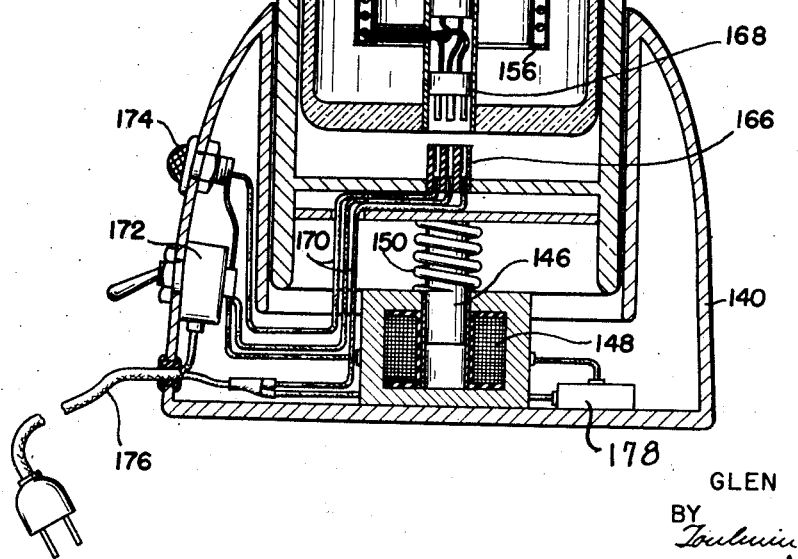
INVENTOR
GLEN H. MOREY
BY
*Toulmin & Toulmin*
ATTORNEYS.

Patented June 2, 1953

2,640,907

UNITED STATES PATENT OFFICE 2,640,907

WARMING DEVICE

Glen H. Morey, Terre Haute, Ind., assignor to Glas-Col Apparatus Co., Inc., Terre Haute, Ind., a corporation of Indiana Application December 1, 1950, Serial No. 198,605

6 Claims. (Cl. 219—43)

This invention relates to a method and apparatus for warming containers, and is particularly concerned with a method and apparatus for warming infants' nursing bottles and the like.

Heretofore there have been available for purchase certain devices for warming infants' nursing bottles which are utilized chiefly to prepare the bottles for night feedings, thereby eliminating the necessity of going to the trouble of heating the feeding bottle on a stove. Such devices in the main have not been entirely satisfactory, due either to weaknesses in construction, or due to the fact that no accurate control of the temperature of the nursing bottle could be had.

Bottle warmers according to the prior art were generally merely warming devices and provided no means for keeping a bottle warm for a length of time, thereby making it hazardous to do anything except leave the bottle under refrigeration until ready for use.

Also, such devices were found to be exceedingly slow in operation, and the comparatively low heat conductivity of milk and other mixtures used for feeding infants often led to a condition where the container or bottle and the contents immediately inside were overheated, with the portion of the contents about the center of the bottle being underheated. While this condition can be remedied by agitating the contents of the bottle after heating, certain feeding compositions have a tendency to become altered when heated to too high a temperature, and thus there is considerable danger of the feeding being of an improper nature due to the overheating of the outside part thereof.

Further, with the bottle being somewhat overheated, it becomes difficult to determine whether the contents are of the right temperature or not.

The primary object of the present invention is to provide a warming device of the type referred to which will overcome the difficulties referred to above.

A further object is the provision of a method and apparatus for warming nursing bottles and the like which is much more rapid and efficient than is now to be found in the art.

A still further object is to provide a bottle warmer of the type referred to having long life and which will not deteriorate in use.

A particular object is the provision of a bottle warmer which will automatically turn off when the bottle being warmed reaches the proper temperature.

It is also a particular object to provide a bottle warmer which will indicate the completion of its warming cycle when it automatically shuts off.

A still further object is the provision of an arrangement for warming nursing bottles and the like in which an intimate thermal relationship exists between the heating element and the material being warmed, thereby leading to highly efficient operation.

In general, the objects of this invention are obtained by providing a device having a well in which a nursing bottle or the like can be placed and which well or bottle is provided with a heating element. Thermostatic means are provided for interrupting the supply of energy to the heating element when the nursing bottle reaches the proper temperature and a signal light is connected in the circuit so as to become illuminated when the heating element becomes deenergized. An arrangement is provided for agitating the container so that all of the contents thereof are always at substantially the same temperature, thereby insuring that the bottle will be ready for use as soon as the heating cycle ends.

According to one modification of my invention, the part of the device containing the well that receives the bottle is reciprocated, thereby to agitate the contents of the bottle, and in another modification, that part of the device is oscillated about a pivotal support to bring about agitation of the contents of the bottle.

According to still another modification of my invention there is an elastic sleeve in which the heating element is placed and which may comprise the wall of the well to receive the bottle, the elastic sleeve insuring an intimate thermal relationship between the bottle and the heating element, thus promoting efficiency in operation due to the elimination of the air space that would otherwise exist between the heating element and the bottle.

A preferred modification of my invention utilizes a heating element embodied in the bottle or container which it is desired to heat, and this element is connected to a source of energy when the bottle or container is mounted in the supporting device.

The foregoing objects and other objects and advantages will become more apparent upon reference to the following description taken in connection with the accompanying drawings in which:

Figure 1 is a vertical section through one form of my invention;

Figure 2 is a partial plan section indicated on line 2—2 of Figure 1;

Figure 3 is a partial vertical section indicated on line 3—3 on Figure 2;

Figure 4 is a plan section indicated by line 4—4 on Figure 1 showing the latching means for retaining the two parts of the device together;

Figure 5 is a view indicated by line 5—5 on Figure 4 showing the manner of making electrical connection with the leads extending to the signal light of the detachable cover of the device.

Figure 6 is a diagrammatic electric circuit showing one manner of connecting the several circuit components of the device together;

Figure 7 is a view partly in section showing another form which my invention may take;

Figure 8 is a view generally indicated on line 8—8 of Figure 7;

Figure 9 is a fragmentary view showing a dash pot arrangement that could be used with either of the modifications of Figures 1 or 7;

Figure 10 is a sectional view showing a resilient type heating element adapted for use in the device of this invention;

Figure 11 is a fragmentary perspective view showing a portion of the heating element of Figure 10;

Figure 12 is a view similar to Figures 1 and 8 but showing a preferred modification of my invention wherein the heating element is contained within the bottle;

Figure 13 is a plan section indicated by line 13—13 on Figure 12 and showing the arrangement of the heating element in the bottle; and Figure 14 is a view showing the wiring diagram for the arrangement of Figure 12.

Referring to the drawings somewhat more in detail, the device shown in Figure 1 comprises a base part 20, the upper end of which has a sleeve-like opening 22 that receives a hollow cylinder 24. Hollow cylinder 24 is spaced from and surrounds an inner cylinder 26 that forms a well for receiving an infant's nursing bottle or the like, as indicated at 28.

A heating element surrounds inner cylinder 26 and is identified by reference numeral 30. Insulation 32 fills the space between cylinders 24 and 26, thereby insuring that substantially all of the heat generated by the heating element will pass into the well defined by inner cylinder 26. The cylinders 24 and 26 and the insulation therebetween form a support for the article to be heated.

The lower end of outer cylinder 24 is closed by a plate 34, and the lower end of inner cylinder 26 by a plate 36. At their upper ends the said cylinders are interconnected and comprise the groove part 38 of a bayonet type latch which is best illustrated in Figure 4. The bayonet type latch includes notches 40 adapted for receiving lugs 42 which are carried by the cover or closure part 44 so the said cover can be detachably connected to the cylinders 24 and 26.

Inside the cover there is preferably a compression spring 46 that will bear on top of bottle 28 so that when the cylinders are reciprocated, as will be explained hereinafter, the bottle will remain in position within the well. Cover 44 also includes a light 48 that may have a transparent or translucent cap 50 thereover. Light 48 is for the purpose of indicating the termination of the heating cycle of the heating element 30.

Extending downwardly from plate 34 at the bottom of cylinder 24 is a magnetic plunger 52 that projects into a solenoid 54. A spring 56 bears between plate 34 and a suitable stationary surface therebeneath, as, for example, the upper end of solenoid 54. It will at this point be apparent that energization of solenoid 54 will draw plunger 52 and the reciprocating portion of the device, namely, the support, downwardly, whereas de-energization of solenoid 54 will permit movement upwardly of the reciprocating part by a spring 56.

Solenoid 54 may be mounted on a cover plate 58 attached to base 20 of the device, and means for alternately energizing and de-energizing the solenoid will be seen to comprise a switch 60 having operating arm 62 adapted for engagement by a pin 64 carried by plunger 52.

For preventing rotation of the reciprocating part within base 20, outer cylinder 24 may be formed with one or more projecting parts on its outer periphery, as indicated at 66 in Figure 2. The sleeve-like part 22 of base 20 is, of course, formed to receive the portion or portions 66 so that while the reciprocating part of the device is freely reciprocable in base 20, it is held against rotation relative thereto.

Shoulders 68 may be provided adjacent the lower end of outer sleeve 24 in order to prevent the said outer sleeve from slipping out of the base part during operation of the device.

A control switch 70 may advantageously be mounted in the outer wall of base 20. This controls the supply of power from power line 72 to the operating auxiliaries of the warming device.

Inasmuch as the cover 44 must be detachable, means are provided for connecting the light 48 in circuit, as illustrated in Figures 4 and 5. The cover 44 may carry a pair of spaced blades 74, and these are adapted to register with and contact contacts 76 when the cover is in position. In this manner the light is connected in circuit, but the cover is readily removable at any time.

The device of this invention includes the thermostatic control element, and this may be located adjacent the base plate 36 of inner cylinder 26, as represented at 78 in Figure 1. This thermostat may be of any suitable type, and I have indicated this member as a disk thermostat in the drawings.

The electrical circuit associated with the warming device is illustrated in Figure 6, and it will therein be seen that the closing of switch 70 will connect the heating element 30 in series with thermostat 78. The light 48 is connected in parallel with thermostat 78 and is thereby normally extinguished. Solenoid 54 is in series with its switch 60 and in parallel with heating element 30.

It will be evident that the arrangement is such that the solenoid and heating element will be operative while switch 70 is closed and thermostat 78 is closed, and that light 48 will become illuminated when thermostat 78 opens, and at the same time, solenoid 54 and heating element 30 will become substantially inoperative.

In the arrangement of Figures 7 and 8 the base of the warming device is shown at 80 and mounted thereon is the movable part 82 of the device, as by the trunnions 84. The movable part includes a well 86 having a heating element 98 which corresponds with heating element 30 of the first modification.

The detachable cover 92 having the light 94 with a cap 96 corresponds to cover 44, light 48, and cap 50 of the first modification.

In Figure 7 the thermostat 98 is represented as being adjustable by the adjusting member 100 should it be desired to vary the temperature at which the heating element cuts out.

In the base 80 of the device there is a plunger 102 having a pin 104 that engages slots 106 in the bifurcated depending part 108 of the movable portion 82. Springs 110 bear on opposite sides of this depending part and normally determine an upright position for movable portion 82.

A solenoid 112 associated with plunger 82 is energizable for moving the plunger, thereby to oscillate the movable portion 82. As in the case of the first modification, a switch 114 having an operating arm 116 adapted for engagement by plunger 102 may be provided for obtaining alternate energization and de-energization of the solenoid to bring about a continuous oscillating movement of movable portion 82 while the device is in operation.

The electric circuit and the manner of operation thereof for the modification of Figures 7 and 8 may be identical with that illustrated in Figure 6 and need not, therefore, be described in particular.

In the case of either of the modifications of Figure 1 or Figures 7 and 8, it may be desirable to modify the manner in which the bottle being warmed is agitated in order to insure agitation of the contents thereof, and one manner of accomplishing this is illustrated in Figure 9 wherein there is shown a dash pot comprising cylinder 118 having a piston 120 therein that may be connected with a plunger 122 which corresponds to either plunger 52 of Figure 1 or plunger 102 of Figure 8.

This piston is of the cup type and moves freely leftwardly in cylinder 118, but entraps air therein when moving rightwardly in the cylinder, and which air must bleed out port 124, thereby controlling the speed at which the piston will move toward the bottom of the cylinder.

It will be evident that the dash pot arrangement described will provide for a quick movement of the bottle and its support in one direction, and a slow movement thereof in the other direction.

In Figures 10 and 11 I have illustrated a modified arrangement of the heating element wherein the heating element 126 is embedded in a rubber-like sleeve 128 having supporting ring 130 at the opposite ends thereof for holding the said ends stationary. This forms an elastic sleeve arrangement which will closely embrace bottles and thus promote the efficiency of heat transfer from the heat element to the bottle. It will be obvious that the resilient sleeve arrangement of Figure 10 could be employed with any of the described modifications.

To permit stretching and contracting of the sleeve the element 126 may be placed therein, as illustrated in Figure 11, wherein it will be seen that the wires of the heating element are placed in the sleeve in an undulating manner so they will readily bend when the sleeve is either stretched or collapsed.

The device of this invention may, of course, be made of a variety of materials, but in most instances, due to the relatively low temperatures that are necessary, plastic will be employed. Metal, however, or a combination of metal or plastic could be utilized with no change in the basic design.

The material of the inner cylinder forming the well which receives the bottle could likewise be made of plastic or metal, or could be a suitable fabric material, or, as in the case of Figures 10 and 11, a resilient material, such as natural or synthetic rubber compounded to resist the temperature developed by the heating element. In this connection, a silicone rubber would be highly efficient, inasmuch as it can be compounded to withstand temperatures well above four hundred degrees Fahrenheit, and which is substantially greater than any temperature that will ever be generated in the heating element during normal operation.

It is believed that the operation of the first modification will be evident; closing of switch 70 will energize the heating element 30 and also commence reciprocation of the part of the device holding the bottle. The shaking of the bottle in this manner brings about continuous mixing and agitation of the contents so that when thermostat 78 opens to de-energize the heating element and the solenoid and to illuminate light 50, the bottle and its entire contents will be at one and the same proper temperature.

In the case of the modification of Figures 7 and 8, an identical cycle obtains, except that the portion of the device holding the bottle will oscillate about its pivotal support.

Figures 12, 13, and 14 show a preferred form which my invention may take, wherein there is a base member 140 corresponding generally to base member 20 of Figure 1 and base member 80 of Figure 7. Vertically reciprocable in this base element is the member 142 forming the supporting well for bottle 144. Well 142 has armature 146 extending into solenoid 148 and a spring 150 is arranged to oppose the action of solenoid 148 on armature 146 whereby well member 142 can be reciprocated in the same manner previously described.

The bottle 144 may be constructed of glass or any of a number of plastics, preferably clear and including heating element generally indicated at 152 that consists of a pair of spaced thin metallic cylinders 154 having their ends closed, as by plates 156, thereby forming a fluid-tight space for receiving a conventional electric heating element 158.

In the center of the hollow heating cylinder thus formed is a hollow metal tube 160 which is supported on the cylinder, as by the thin ribs 162 (best seen in Figure 13). Located within tube 160 is the tubular thermostat 164 which controls the operation of the warming device in the same manner as the thermostats of the previous modifications.

In the base of well member 142 there is arranged the three wire female electrical connector 166 and mounted on the lower end of tube 160 is the three-part male electrical connector 168, the arrangement being such that when the bottle is placed in the well the two parts of the electrical connectors will be brought together and a supply of electric current will be established for the electric heating element.

The female electrical connector 166 is connected by the wires 170 with the manual switch 172, indicating light 174, and lead-in wire 176 in the manner better illustrated in the diagrammatic showing of Figure 14.

In Figure 14 it will be noted that there is arranged in circuit with solenoid 148 a circuit element 178 which may comprise a current or temperature responsive device for periodically interrupting the supply of current to the solenoid. In this manner the supply of current to solenoid 148 is cyclical and a cyclical movement of the well member takes place as in the manner described in the other modifications.

It will be evident from the arrangement of thermostat 164, heating element 163, and light 174 that the said light will be brightly lighted whenever thermostat 134 is closed, but will diminish substantially in brilliance when the said thermostat opens, thereby giving a ready indication that the warming cycle is completed whenever the contents of the bottle reach the proper temperature.

In connection with any of the modifications described, the advantage obtains of a rapid heating cycle, but, due to the agitation of the contents of the bottle, there is no danger of overheating, or an apparently hot bottle being, in fact, too cool. The device automatically shuts off when its heating cycle is completed and gives a clearly visible indication that the bottle is ready for use.

One of the advantages to be found in connection with my invention, as illustrated in Figures 1 and 8, in addition to those described above, is that, inasmuch as the bottle support is insulated and has a closure cover thereon, it will act to maintain a bottle placed therein cold until the device is placed in operation to warm the bottle. Thus it becomes possible to place a chilled bottle in the device and to leave it there for a couple of hours without the danger of the bottle becoming warm and the contents spoiling.

The device of this invention has been described for use as a warmer for nursing bottles, but it will be apparent that it is capable of warming other containers, such as cans of soup or the like, in restaurants or in the home, and that the same advantages of operation would obtain in that a rapid heating cycle would result and the contents be heated at a uniform rate, due to the agitation thereof by movement of the support.

In connection with the preferred modification of Figure 12, the advantage obtains that a very efficient heating cycle is obtained because all of the energy developed in the heating element is transferred directly to the contents of the bottle without the necessity of causing the energy to flow through the wall of the bottle. The arrangement of the heating element, in its cylindrical and open form, enables it to be readily cleaned, and, inasmuch as all of the wiring including the heating element and the thermostat are hermetically sealed within the heating element, there is never any contact of the contents of the bottle with the said wiring. In this manner the contents of the bottle cannot be contaminated, and the heating element and wiring arrangement are never subjected to any deterioration due to the said contents.

It will be understood that this invention is susceptible to modification in order to adapt it to different usages and conditions, and, accordingly, it is desired to comprehend such modifications within this invention as may fall within the scope of the appended claims.

I claim:

1. In a warming device for nursing bottles and the like; a base, a support reciprocable in the base including a well to receive the bottle, an electric heating element for heating the contents of a bottle in the bottle, means including a magnetic plunger on one of said base and support and a solenoid on the other thereof to attract said plunger for reciprocating said support, switch means in the base for simultaneously energizing said element and solenoid thereby to subject said bottle to warming and agitation, and a thermostat positioned adjacent said well so as to be activated by the temperature of the bottle and circuit means for connecting said thermostat in series with said switch means, solenoid and heating element for de-energizing said element and solenoid upon said thermostat reaching a predetermined temperature.

2. In a warming device for nursing bottles and the like; a base, a support reciprocable in the base including a well to receive the bottle, means for heating the bottle including an electric heating element heating the contents of a bottle in, means including a magnetic plunger on one of said base and support and a solenoid on the other thereof to attract said plunger for reciprocating said support, switch means in the base for simultaneously energizing said element and solenoid thereby to subject the contents of said bottle to warming and agitation, and a thermostat positioned adjacent said well so as to be activated by the temperature of the bottle and circuit means for connecting said thermostat in series with said switch means, solenoid and heating element for de-energizing said element and solenoid upon said thermostat reaching a predetermined temperature, said support and base comprising interengaging portions to prevent relative rotation thereof.

3. A bottle warming and agitating device comprising: a base, a support reciprocally mounted in said base and including a well to receive the bottle, means for heating said bottle including a heating element, a temperature controlling device, said heating element and temperature device being positioned in heat conducting relation to said bottle, means for reciprocating said support including first and second switch means and an electromagnetic means, said first switch means alternately energizing and de-energizing said electromagnetic means, and circuit means for connecting said heating means, said electromagnetic means, said temperature controlling device and said first and second switch means, said second switch means upon closure automatically initiating action of said reciprocating and heating means, and said temperature controlling device comprising means for de-energizing said reciprocating and heating means upon reaching a predetermined temperature.

4. In a warming device for nursing bottles and the like: a base, a support reciprocable in the base including a well to receive the bottle, means for heating the bottle including an electric heating element, and a thermostat for regulating the temperature in said bottle, means including a magnetic plunger on said support and a solenoid on said base to attract said plunger for reciprocating said support, a circuit for connecting said solenoid, said element, and said thermostat, a first switch means in said circuit for independently energizing and de-energizing said solenoid, and a second switch means for applying power to said circuit, said thermostat comprising means for disconnecting said power from said circuit upon reaching a predetermined temperature.

5. In a warming device for nursing bottles and the like: a base, a support reciprocable in the base including a well to receive the bottle, means for heating the bottle including an electric heating element, and a thermostat for regulating the temperature in said bottle, means including a magnetic plunger on said support and a solenoid on said base to attract said plunger for reciprocating said support, a circuit for connecting said solenoid, said element, and said thermostat, a first switch means in said circuit for independently energizing and de-energizing said solenoid, means on said plunger for opening and closing said first switch means, and a second switch means for applying power to said circuit, said thermostat comprising means for disconnecting said power from said circuit upon reaching a predetermined temperature.

6. A bottle warming and agitating device for nursing bottles and the like comprising: a base, a support reciprocally mounted in said base and including a well to receive the bottle, means for heating the bottle including a heating element, a thermostat positioned in heat conducting relation with said bottle, means for simultaneously reciprocating said support and energizing said element and means for automatically stopping said reciprocating and energization upon said thermostat reaching a predetermined temperature, said heating element being located internally of said bottle.

GLEN H. MOREY.

References Cited in the file of this patent

UNITED STATES PATENTS

| Number | Name | Date |
|---|---|---|
| 1,063,614 | Stanley et al. | June 3, 1913 |
| 1,393,751 | Chapin | Oct. 18, 1921 |
| 1,414,494 | Arntfield | May 2, 1922 |
| 1,464,255 | Zimmermann | Aug. 7, 1923 |
| 1,739,587 | Greenberg | Dec. 17, 1929 |
| 1,806,004 | Tavender | May 19, 1931 |
| 1,997,400 | Wysocki | Apr. 9, 1935 |
| 2,012,981 | Wilsey | Sept. 3, 1935 |
| 2,062,941 | Samuels | Dec. 1, 1936 |
| 2,116,367 | Smith | May 3, 1938 |
| 2,293,764 | Roeder | Aug. 25, 1942 |
| 2,356,004 | Price | Aug. 15, 1944 |
| 2,483,628 | Davis | Oct. 4, 1949 |
| 2,483,979 | Morrill | Oct. 4, 1949 |
| 2,501,366 | Wandelt | Mar. 21, 1950 |
| 2,516,637 | McCollum | July 25, 1950 |
| 2,530,794 | Tiscione | Nov. 21, 1950 |
| 2,546,983 | Del Buttero | Apr. 3, 1951 |

FOREIGN PATENTS

| Number | Country | Date |
|---|---|---|
| 103,183 | Switzerland | Jan. 16, 1924 |
| 593,638 | France | Aug. 28, 1925 |
| 596,327 | Great Britain | Jan. 1, 1948 |
| 907,269 | France | Mar. 7, 1946 |